Patented Apr. 2, 1940

2,195,755

UNITED STATES PATENT OFFICE 2,195,755

PRODUCTION OF CALCIUM HYPOCHLORITE PRODUCT

Homer L. Robson and Gregory A. Petroe, Niagara Falls, N. Y., assignors to The Mathieson Alkali Works, Inc., New York, N. Y., a corporation of Virginia No Drawing. Application July 20, 1938, Serial No. 220,262

6 Claims. (Cl. 23—86)

This invention relates to improvements in the manufacture of granular, substantially dustless calcium hypochlorite products from aqueous slurries containing calcium hypochlorite.

Calcium hypochlorite products containing more than about 10% by weight of material which will pass a 100 mesh screen are characteristically dusty. Such dusty products suffer several disadvantages. Dustiness itself is objectionable. Further, however, the presence of such proportions of fines retards the penetration of water into masses of the product thus increasing the time required for solution, involves a tendency to form lumps during solution and involves a tendency toward packing and caking of the product during shipment and storage. Conventional practices for the production of dry calcium hypochlorite products of predetermined maximum particle size introduce, into the product, proportions of minus 100 mesh material usually much in excess of 10% and of this fine material a large proportion usually will pass a 300 mesh screen. It is the material which will pass a 300 mesh screen which is responsible for the greater part of the dustiness encountered in calcium hypochlorite products.

The present invention provides a method of operation whereby a moist plastic material containing calcium hypochlorite, obtained by adjusting the water content of an aqueous slurry of precipitated calcium hypochlorite, is transformed into a free flowing, granular, substantially dustless product. We have found that a granular, substantially dustless calcium hypochlorite product can be produced by bringing the calcium hypochlorite slurry to a plastic condition by adjusting its water content, then preforming the resulting plastic material into particles substantially free from fines, i. e., substantially free of particles which could be separated by a 300 mesh screen, and of size and shape predetermined within reasonably close limits, and subsequently drying the preformed particles without substantial crushing. The calcium hypochlorite product of our improved process is not only a free flowing, granular, dustless product but it also affords marked resistance to the abrasion to which it may be exposed in normal handling and storage operations.

The preforming step of the present invention is accomplished by subjecting the plastic calcium hypochlorite material to mechanical pressure appropriate to compress the material and produce particles of a desired size and shape which are substantially free of fines capable of passing a 300 mesh screen. The preformed particles are then dried in any conventional manner which does not involve substantial crushing of the preformed particles. For example, the preformed particles of predetermined size and shape may be dried on stationary pans in a vacuum drier or by suspending them in a stream of heated air. The preformed material may also be dried in a rotary vacuum drier, most advantageously one which contains no lifts, shelves or other projections within the shell and which contains no stationary apparatus within the shell other than the vacuum manifold and its guard. By the term "plastic" which we have used to describe the state of the material which is preformed in our process we intend to refer to a product consisting essentially of calcium hypochlorite and an amount of water appropriate to render the mass capable of being molded. We have found that a material containing calcium hypochlorite, inert substances and water which yields a dry calcium hypochlorite product containing approximately 74% calcium hypochlorite will possess a plasticity appropriate for the preforming step of our process when the water content of said substance is within limits approximating 28% and 36%. We have found that a water content within the range 31% to 35% is particularly advantageous for such a plastic mixture.

The preforming treatment of our improved process may be accomplished in a variety of ways. One advantageous method of preforming the plastic material is by extrusion. In this method of operating, a plastic mass, such as that just mentioned having a water content between 28% and 36%, is forced through a die which delivers a continuous column having a shape fixed by the die, and this column is then cut or broken at intervals to give particles of a desired size. Commercial equipment will readily produce cylindrical particles of preformed material having, for example, a diameter of ⅛ inch and a length of $\frac{3}{16}$ inch. This combination of diameter and length may be varied and still be suitable to produce a granular dustless product on drying. Another method of preforming involves compressing the material into grooves cut in a drum by means of a smooth roll bearing on the grooved drum. The material is continuously lifted from the grooves by suitably fixed strips which lift and break the material into particles of suitable size. The plastic material may also be preformed by compressing it into flat sheets which are then broken into suitable sizes. Such flat sheets are produced by passing the plastic material between two rolls having substantially the same peripheral speed, or by the use of one roll and a flat surface. The plastic material may also be preformed into compressed particles of predetermined size and shape by stamping or by pressing the plastic mass into molds or forms.

In order to produce a product which contains approximately 74% calcium hypochlorite it may be necessary to introduce an inert filler or extender. Sodium chloride is a satisfactory compound for such a purpose. Some sodium chloride may be introduced into the calcium hypochlorite slurry during the process of manufacture, and an additional amount may be added to the slurry to bring the final product to a uniform composition containing 74% calcium hypochlorite. Other substances than sodium chloride may be used as fillers. It is preferable that the filler be inert and possess properties similar to sodium chloride. It is possible to use calcium hydroxide as a diluent or extender in place of sodium chloride. When this compound is present in the plastic material in concentrations in excess of those which will result in a calcium hydroxide concentration in the product greater than 2–3%, however, the water content of the plastic material to be preformed to produce such a product should be decreased by an amount determined by the quantity of calcium hydroxide present in the slurry. Each added percent of calcium hydroxide in the product should be accompanied by a lowering of approximately 1% in the water content of the plastic material to obtain comparable plasticity. This added regulation is necessitated by the fact that calcium hydroxide is not inert but combines chemically with the calcium hydrochlorite to form a basic salt.

A typical product of the process of our invention may analyze, for example:

| | Per cent |
|---|---|
| Calcium hypochlorite | 74 |
| Calcium chlorate | 1.2 |
| Calcium hydroxide | 3.0 |
| Calcium carbonate | 2.0 |
| Calcium chloride | 2.0 |
| Sodium chloride | 17 |
| Water | 1.0 |

While special reference has been made herein to a product containing approximately 74% calcium hypochlorite, it will be understood that our process is not limited to the production of granular, substantially dustless products of this specific composition.

We claim:

1. In the production of a granular, substantially dustless calcium hypochlorite product, the improvement which comprises adjusting the water content of an aqueous slurry of calcium hypochlorite to about 28–36% to render the slurry plastic, preforming the plastic material under pressure into particles substantially free from fines and drying the preformed particles without substantial crushing.

2. In the production of a granular, substantially dustless calcium hypochlorite product containing about 74% calcium hypochlorite, the improvement which comprises adjusting the water content of an aqueous slurry of calcium hypochlorite to a value approximating 28–36%, preforming the resulting plastic material under pressure into particles substantially free from fines and drying the preformed particles without substantial crushing.

3. In the production of a granular, substantially dustless calcium hypochlorite product containing about 74% calcium hypochlorite, the improvement which comprises adjusting the water content of an aqueous slurry of calcium hypochlorite to a value approximating 31–35%, preforming the resulting plastic material under pressure into particles substantially free from fines and drying the preformed particles without substantial crushing.

4. In the production of a calcium hypochlorite product wherein calcium hypochlorite is produced in the form of an aqueous slurry thereof, the improvement which comprises adjusting the water content of the calcium hypochlorite slurry to approximately 28–36%, to render the slurry plastic, preforming the plastic material under pressure into particles substantially free from fines, and drying the preformed particles without substantial crushing, whereby a substantially dustless granular calcium hypochlorite product is obtained.

5. In the production of a calcium hypochlorite product containing about 74% calcium hypochlorite wherein calcium hypochlorite is produced in the form of an aqueous slurry thereof, the improvement which comprises adjusting the water content of the calcium hypochlorite slurry to a value approximating 28–36%, performing the resultant plastic material under pressure into particles substantially free from fines, and drying the preformed particles without substantial crushing, whereby a substantially dustless granular calcium hypochlorite product is obtained.

6. In the production of a calcium hypochlorite product containing about 74% calcium hypochlorite wherein calcium hypochlorite is produced in the form of an aqueous slurry thereof, the improvement which comprises adjusting the water content of the calcium hypochlorite slurry to a value approximating 31–35%, preforming the resulting plastic material under pressure into particles substantially free from fines, and drying the preformed particles without substantial crushing, whereby a substantially dustless granular calcium hypochlorite product is obtained.

HOMER L. ROBSON.
GREGORY A. PETROE.